United States Patent
Yang et al.

(10) Patent No.: US 12,206,993 B2
(45) Date of Patent: Jan. 21, 2025

(54) SYSTEM AND METHOD FOR MOTION WARPING USING MULTI-EXPOSURE FRAMES

(71) Applicant: Samsung Electronics Co., Ltd., Suwon-si (KR)

(72) Inventors: Anqi Yang, Plano, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 17/938,013

(22) Filed: Oct. 4, 2022

(65) Prior Publication Data

US 2023/0022753 A1    Jan. 26, 2023

Related U.S. Application Data

(62) Division of application No. 16/837,785, filed on Apr. 1, 2020, now Pat. No. 11,503,221.

(51) Int. Cl.
| | |
|---|---|
| *H04N 23/73* | (2023.01) |
| *G06T 5/50* | (2006.01) |
| *G06T 5/73* | (2024.01) |
| *H04N 19/42* | (2014.01) |
| *H04N 23/743* | (2023.01) |

(52) U.S. Cl.
CPC ............ *H04N 23/73* (2023.01); *G06T 5/50* (2013.01); *G06T 5/73* (2024.01); *H04N 19/42* (2014.11); *H04N 23/743* (2023.01); *G06T 2207/10144* (2013.01); *G06T 2207/20084* (2013.01); *G06T 2207/20221* (2013.01)

(58) Field of Classification Search
CPC ....... H04N 23/73; H04N 19/42; H04N 23/743
See application file for complete search history.

(56) References Cited

U.S. PATENT DOCUMENTS

| | | |
|---|---|---|
| 10,911,691 B1 | 2/2021 | Le et al. |
| 10,939,042 B1 | 3/2021 | Dolan |
| 2006/0133688 A1 | 6/2006 | Kang et al. |

(Continued)

FOREIGN PATENT DOCUMENTS

EP   3836527 A1 *  6/2021  ............. H04N 23/45

OTHER PUBLICATIONS

Occlusion—Aware Video Deblurring with a New Layered Blur Model, Byeongjoo et al., 2016 (Year: 2016).*

(Continued)

*Primary Examiner* — James M Hannett

(57) ABSTRACT

A method includes obtaining, using at least one image sensor of an electronic device, a first image frame and multiple second image frames of a scene. Each of the second image frames has an exposure time different from an exposure time of the first image frame. The method also includes generating, using at least one processor, blur kernels indicating a motion direction of the first image frame using an optical flow network. The method further includes refining, using the at least one processor, the blur kernels using a convolutional neural network. In addition, the method includes generating, using the at least one processor, a target image frame of the scene using the refined blur kernels and occlusion masks for the second image frames.

20 Claims, 12 Drawing Sheets

(56) References Cited

U.S. PATENT DOCUMENTS

| | | | |
|---|---|---|---|
| 2011/0304687 A1 | 12/2011 | Joshi et al. | |
| 2015/0341576 A1 | 11/2015 | Gu et al. | |
| 2017/0064204 A1* | 3/2017 | Sapiro | G06T 5/20 |
| 2017/0237905 A1 | 8/2017 | Molgaard et al. | |
| 2019/0096046 A1* | 3/2019 | Kalantari | G06T 5/92 |
| 2019/0244331 A1* | 8/2019 | Gu | G06F 18/24133 |
| 2019/0363118 A1 | 11/2019 | Berkovich et al. | |
| 2021/0158512 A1* | 5/2021 | Sun | G06T 13/80 |

OTHER PUBLICATIONS

International Search Report and Written Opinion of the International Searching Authority dated Jun. 9, 2021 in connection with International Patent Application No. PCT/KR2021/002332, 8 pages.

Xie et al., "Multi-Exposure Motion Estimation Based on Deep Convolutional Networks," Journal of Computer Science And Technology, 33(3), May 2018, 15 pages.

Kupyn et al., "DeblurGAN: Blind Motion Deblurring Using Conditional Adversarial Networks," Proceedings of the IEEE Conference on Computer Vision and Pattern Recognition, 2018, pp. 8183-8192.

Zhang et al., "Dynamic Scene Deblurring Using Spatially Variant Recurrent Neural Networks," Proceedings of the IEEE Conference on Computer Vision and Pattern Recognition, 2018, pp. 2521-2529.

Chen et al., "Reblur2Deblur: Deblurring Videos via Self-Supervised Learning," 2018 IEEE International Conference on Computational Photography (ICCP), 2018, 9 pages.

Kim et al., "Generalized Video Deblurring for Dynamic Scenes," Proceedings of the IEEE Conference on Computer Vision and Pattern Recognition, 2015, pp. 5426-5434.

Kim et al., "Optical Flow via Locally Adaptive Fusion of Complementary Data Costs," IEEE International Conference on Computer Vision (ICCV), 2013, pp. 3344-3351.

Yuan et al., "Image Deblurring with Blurred/Noisy Image Pairs," ACM Transactions on Graphics, Jul. 2007, 9 pages.

Šroubek et al., "Robust Multichannel Blind Deconvolution via Fast Alternating Minimization," IEEE Transactions on Image Processing, vol. 21, Issue 4, Apr. 2012, pp. 1687-1700.

* cited by examiner

SYSTEM AND METHOD FOR MOTION WARPING USING MULTI-EXPOSURE FRAMES

CROSS-REFERENCE TO RELATED APPLICATION AND PRIORITY CLAIM

This application claims priority under 35 U.S.C. § 120 as a divisional of U.S. patent application Ser. No. 16/837,785 filed on Apr. 1, 2020, which is hereby incorporated by reference in its entirety.

TECHNICAL FIELD

This disclosure relates generally to image capturing systems. More specifically, this disclosure relates to a system and method for motion warping using multi-exposure frames.

BACKGROUND

Many mobile electronic devices, such as smartphones and tablet computers, include cameras that can be used to capture still and video images. While convenient, cameras on mobile electronic devices typically suffer from a number of shortcomings. For example, cameras on mobile electronic devices typically have poor performance in low-light situations. While it is possible to increase the amount of light collected at an image sensor by increasing the exposure time, this also increases the risk of producing blurred images due to object and camera motion. One approach to addressing blur is to capture multiple image frames of a scene and then combine the "best" parts of the image frames to produce a blended image. However, producing a blended image from a set of image frames with different exposures is a challenging process, especially for dynamic scenes.

SUMMARY

This disclosure provides a system and method for motion warping using multi-exposure frames.

In a first embodiment, a method includes obtaining, using at least one image sensor of an electronic device, a first image frame and multiple second image frames of a scene. Each of the second image frames has an exposure time different from an exposure time of the first image frame. The method also includes generating, using at least one processor, blur kernels indicating a motion direction of the first image frame using an optical flow network. The method further includes refining, using the at least one processor, the blur kernels using a convolutional neural network. In addition, the method includes generating, using the at least one processor, a target image frame of the scene using the refined blur kernels and occlusion masks for the second image frames.

In a second embodiment, an apparatus includes at least one image sensor. The apparatus also includes at least one processing device configured to obtain a first image frame and multiple second image frames of a scene using the at least one image sensor. Each of the second image frames has an exposure time different from an exposure time of the first image frame. The at least one processing device is also configured to generate blur kernels indicating a motion direction of the first image frame using an optical flow network. The at least one processing device is further configured to refine the blur kernels using a convolutional neural network. In addition, the at least one processing device is configured to generate a target image frame of the scene using the refined blur kernels and occlusion masks for the second image frames.

In a third embodiment, a non-transitory machine-readable medium contains instructions that when executed cause at least one processor of an electronic device to obtain a first image frame and multiple second image frames of a scene using at least one image sensor. Each of the second image frames has an exposure time different from an exposure time of the first image frame. The non-transitory machine-readable medium also contains instructions that when executed cause the at least one processor to generate blur kernels indicating a motion direction of the first image frame using an optical flow network. The non-transitory machine-readable medium further contains instructions that when executed cause the at least one processor to refine the blur kernels using a convolutional neural network. In addition, the non-transitory machine-readable medium contains instructions that when executed cause the at least one processor to generate a target image frame of the scene using the refined blur kernels and occlusion masks for the second image frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B,"

"at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
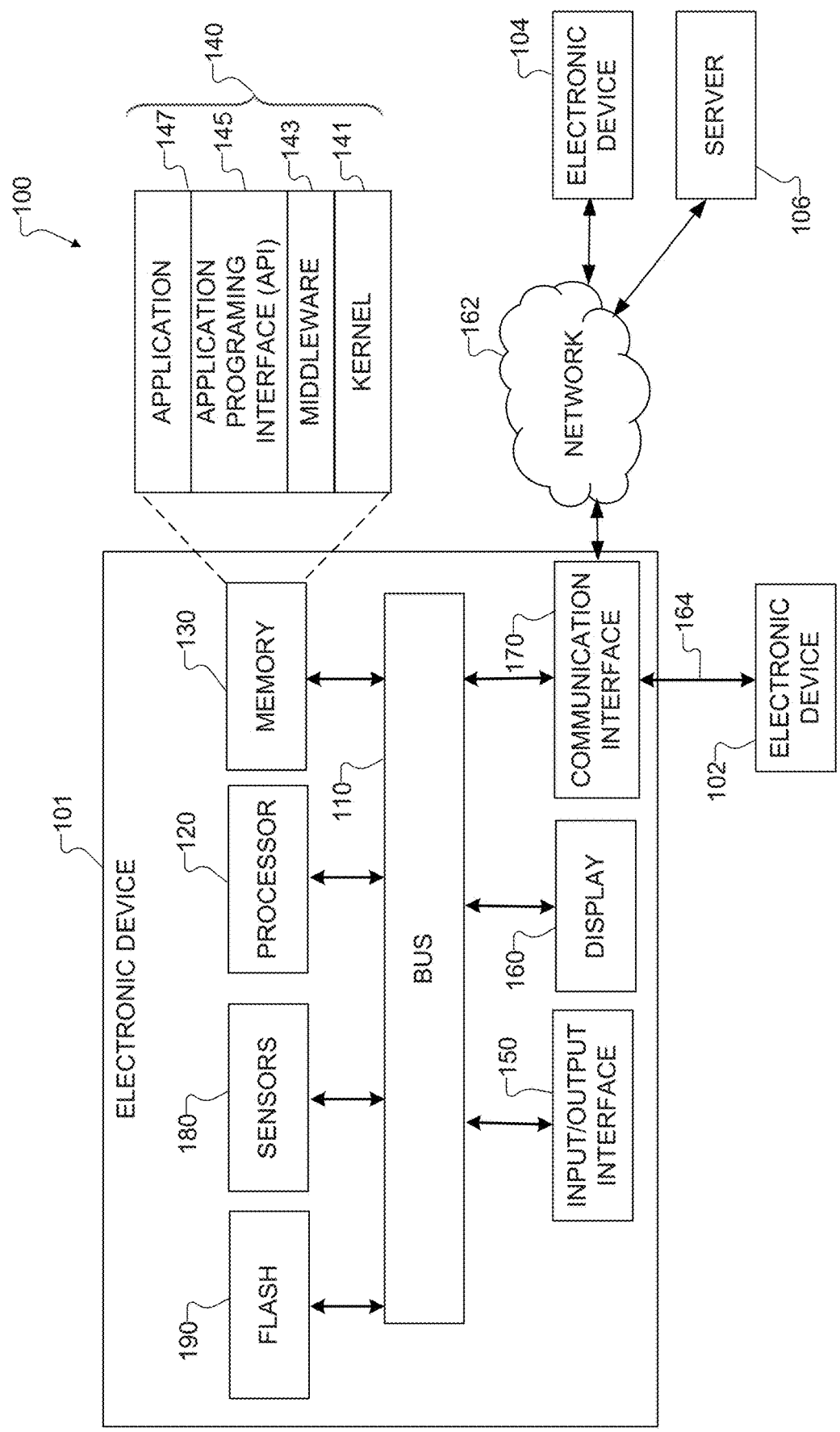
FIG. 1 illustrates an example network configuration including an electronic device in accordance with this disclosure.

FIGS. 1 through 12, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images, but these cameras suffer from a number of shortcomings. For example, these cameras typically have poor performance in low-light situations. While it is possible to increase the amount of light collected at an image sensor by increasing the exposure time, this also increases the risk of producing blurred images due to object and camera motion. One approach to addressing blur, referred to as multi-frame imaging, is to capture multiple image frames of a scene and then combine the "best" parts of the image frames to produce a blended image. Multi-frame imaging plays an important role in tasks such as image deblurring, high dynamic range (HDR) imaging, noise reduction, and the like.

When a scene contains moving objects, it becomes very challenging to handle the motion in multiple image frames. One approach for handling this problem involves detecting each motion region and excluding that region during multi-frame fusion. This approach can result in a region around the moving object having the same quality as if a single image frame is used. Another approach is to register one or more non-reference image frames based on an optical flow and then merge the aligned image frames. However, this registration can be error-prone and can result in inaccurate optical flow estimation. A small offset in optical flow can negatively affect continuous sharp edges in a non-reference image frame.

This disclosure provides various techniques for motion warping in which one or more extracted features of non-reference image frames are aligned to those of a reference image frame according to optical flows between the image frames. As described in more detail below, the motion warping techniques of this disclosure can be flexibly incorporated into generative networks to align the extracted features before feeding them to decoding layers. The disclosed embodiments can be advantageously used in motion deblurring, HDR imaging, multi-frame denoising, and other imaging applications.

Note that while the techniques described below are often described as being performed using a mobile electronic device, other electronic devices could also be used to perform or support these techniques. Thus, these techniques could be used in various types of electronic devices. Also, while the techniques described below are often described as processing image frames when capturing still images of a scene, the same or similar approaches could be used to support the capture of video images.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera during a capture event. Among other things, the processor 120 can process the image data (as discussed in more detail below) using a convolutional neural network to perform motion warping.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other image sensors for capturing images of a scene. The sensor(s) 180 may also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an his sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101. The one or more cameras or other image sensors can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102. (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
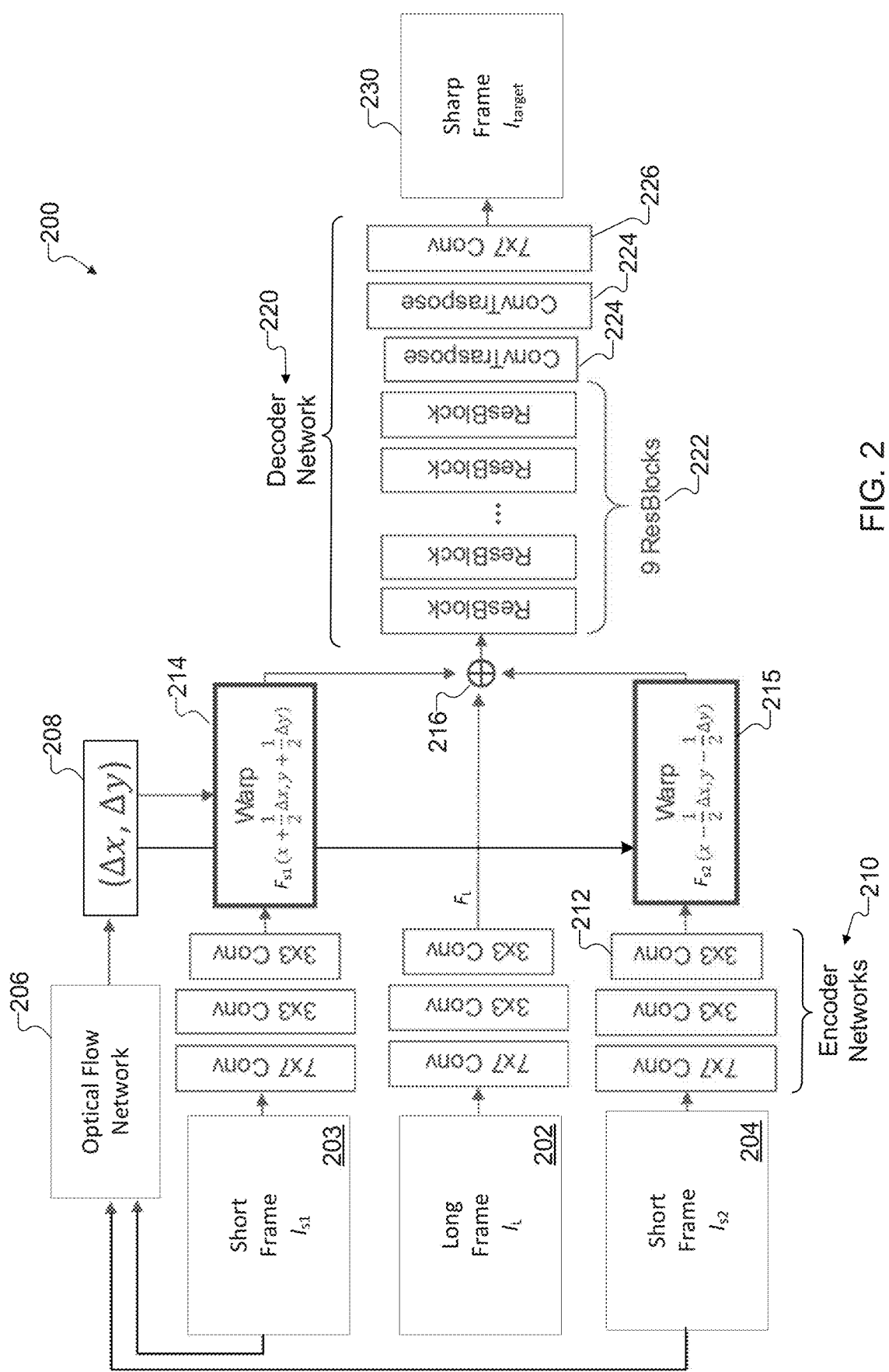
FIG. 2 illustrates an example process for motion warping using multi-exposure image frames in accordance with this disclosure.

FIG. 2 illustrates an example process 200 for motion warping using multi-exposure image frames in accordance with this disclosure. For ease of explanation, the process 200 shown in FIG. 2 is described as involving the use of the electronic device 101 of FIG. 1. However, the process 200 shown in FIG. 2 could be used with any other suitable electronic device and in any suitable system.

As shown in FIG. 2, the electronic device 101 receives or obtains multiple image frames 202, 203, 204 of a scene captured at approximately the same moment using at least one camera or other image sensor 180 of the electronic device 101. The image frame 202 (also referred to as "long frame $I_L$") is captured using a long exposure time, which is as long as, or longer than, an automatically-determined "normal" exposure time. Because the exposure time is long, one or more moving objects in the image frame 202 may have blurry features. The image frames 203-204 (also referred to as "short frame $I_{s1}$" and "short frame $I_{s2}$," respectively) are captured using a short exposure time, which is short at least relative to the normal and long exposure times. Because the exposure time is short, the image frames 203-204 record the one or more moving objects with less or no motion blur. Note that as used here, the terms "short," "normal," and "long" are relative to each other and can represent any suitable exposure times, as long as "normal" is longer than "short" and "long" is as long as, or longer than, "normal." In many cases, "normal" refers to the automatically-determined exposure time that results in an image having a minimum of under-exposed and/or over-exposed regions, which is often referred to as an EV-0 exposure time.

Because of the short exposure time, the two short frames 203-204 record any moving objects with less or no motion blur (relative to the image frame 202). In contrast, the long exposure time of the long frame 202 results in possible blur for any moving objects. To correct the blur in the process 200, the electronic device 101 uses the long frame 202 as a reference frame and uses the short frames 203-204 as non-reference frames. The electronic device 101 aligns any moving objects in the short frames 203-204 with any corresponding moving objects in the long frame 202. However, as described in greater detail below, the alignment is performed on encoded features instead of the original image frames. That is, instead of directly moving image frames, the electronic device 101 first encodes each of the short frames 203-204 into a feature space and then aligns the features. This gives more robust motion compensation without distorting image features, resulting in fewer errors.

The electronic device 101 inputs the three image frames 202, 203, 204 to respective encoder networks 210. Each of the encoder networks 210 is based on a convolutional neural network architecture. A convolutional neural network architecture generally represents a type of deep artificial neural network, which is often applied to analyze images. Each encoder network 210 is composed of multiple convolutional layers 212. Each of the convolutional layers 212 represents a layer of convolutional neurons, which operate to apply a convolution operation that emulates the response of individual neurons to visual stimuli. Each neuron typically applies some function to its input values (often by weighting different input values differently) to generate output values. Each encoder network 210 here is shown as including three convolutional layers 212, but each encoder network 210 could include different numbers of convolutional layers. In some embodiments, each encoder network 210 includes, or is part of, a generative adversarial network (GAN). The output of each encoder network 210 is a feature map that includes a number of features (such as 64, 128, 256, or other number of features). In the process 200, $F_L(x,y)$, $F_{s1}(x,y)$, and $F_{s2}(x,y)$ represent the encoded feature maps for the image frames 202, 203, and 204, respectively.

The electronic device 101 also provides the non-reference short frames 203-204 to an optical flow network 206 for optical flow estimation. Optical flow estimation is a technique for pixel-wise prediction of motion in an image over time. In the process 200, the optical flow network 206 receives the short frames 203-204 and determines the motion between the short frames 203-204. The optical flow network 206 includes any suitable functions, processes, or algorithms for determining motion between image frames. In some embodiments, the optical flow network 206 can include a neural network, such as a convolutional neural network. The output of the optical flow network 206 is an optical flow map 208, which is a matrix of values indicating pixel-wise x and y differences (referred to as Δx and Δy) between the short frames 203-204.

In the process 200, the encoded feature maps $F_{s1}(x,y)$ and $F_{s2}(x,y)$ generated from the short frames 203-204 are aligned to the feature map $F_L(x,y)$ generated from the long frame 202. To accomplish this, the electronic device 101 performs warping operations 214-215. Each warping operation 214-215 receives the optical flow map 208 generated from the optical flow network 206 and applies a translation operation to the corresponding encoded feature map $F_{s1}(x,y)$ or $F_{s2}(x,y)$. The translation amount is determined by the Δx and Δy values in the optical flow map 208. In some embodiments, each warping operation 214-215 is scaled down to match the downscaling from the image to the encoded feature maps. The warping operations 214-215 result in translated feature maps $$F_{s1}\left(x+\frac{1}{2}\Delta x, y+\frac{1}{2}\Delta y\right) \text{ and } F_{s2}\left(x-\frac{1}{2}\Delta x, y-\frac{1}{2}\Delta y\right).$$

At this point in the process 200, the three feature maps representing the moving objects, namely $$F_{s1}\left(x+\frac{1}{2}\Delta x, y+\frac{1}{2}\Delta y\right), F_{s2}\left(x-\frac{1}{2}\Delta x, y-\frac{1}{2}\Delta y\right), \text{ and } F_L(x, y),$$

are aligned. The electronic device 101 combines the aligned features using a concatenator operation 216, and the combined features are input into a decoder network 220. The concatenated features encode the aligned sharp information from the short frames 203-204 to the motion blur regions of the long frame 202 so that the decoder network 220 can generate natural sharp edges.

Like the encoder networks 210, the decoder network 220 is based on a convolutional neural network architecture. In some embodiments, the decoder network 220 includes, or is part of, a GAN. As shown in FIG. 2, the decoder network 220 is composed of multiple residual blocks 222, multiple transposed convolutional layers 224, and a standard convolutional layer 226. While FIG. 2 shows nine residual blocks 222, two transposed convolutional layers 224, and one standard convolutional layer 226, other embodiments of the decoder network 220 could include other numbers of residual blocks, transposed convolutional layers, and standard convolutional layers.

The decoder network 220 is trained to combine the feature map $F_L$ for the long frame 202 and the feature maps $F_{s1}$ and $F_{s2}$ for the short frames 203-204 and generate a sharp frame 230 (referred to as $I_{target}$). The trained decoder network 220 optimizes the image quality of the sharp frame 230 such that the sharp frame 230 exhibits little or no blurring. In some embodiments, the decoder network 220 (particularly the residual blocks 222) perform a blending operation to generate the sharp frame 230. The sharp frame 230 can then be output as a final image for viewing, storing, or further image processing.

Although FIG. 2 illustrates one example of a process 200 for motion warping using multi-exposure image frames, various changes may be made to FIG. 2. For example, while the process 200 is shown as using two short image frames, other embodiments could use more than two short image frames. Also, the operations of the process 200 can be performed by any suitable component(s) of an electronic device 101 or other device, including the processor 120 of the electronic device 101.

Figure 3:
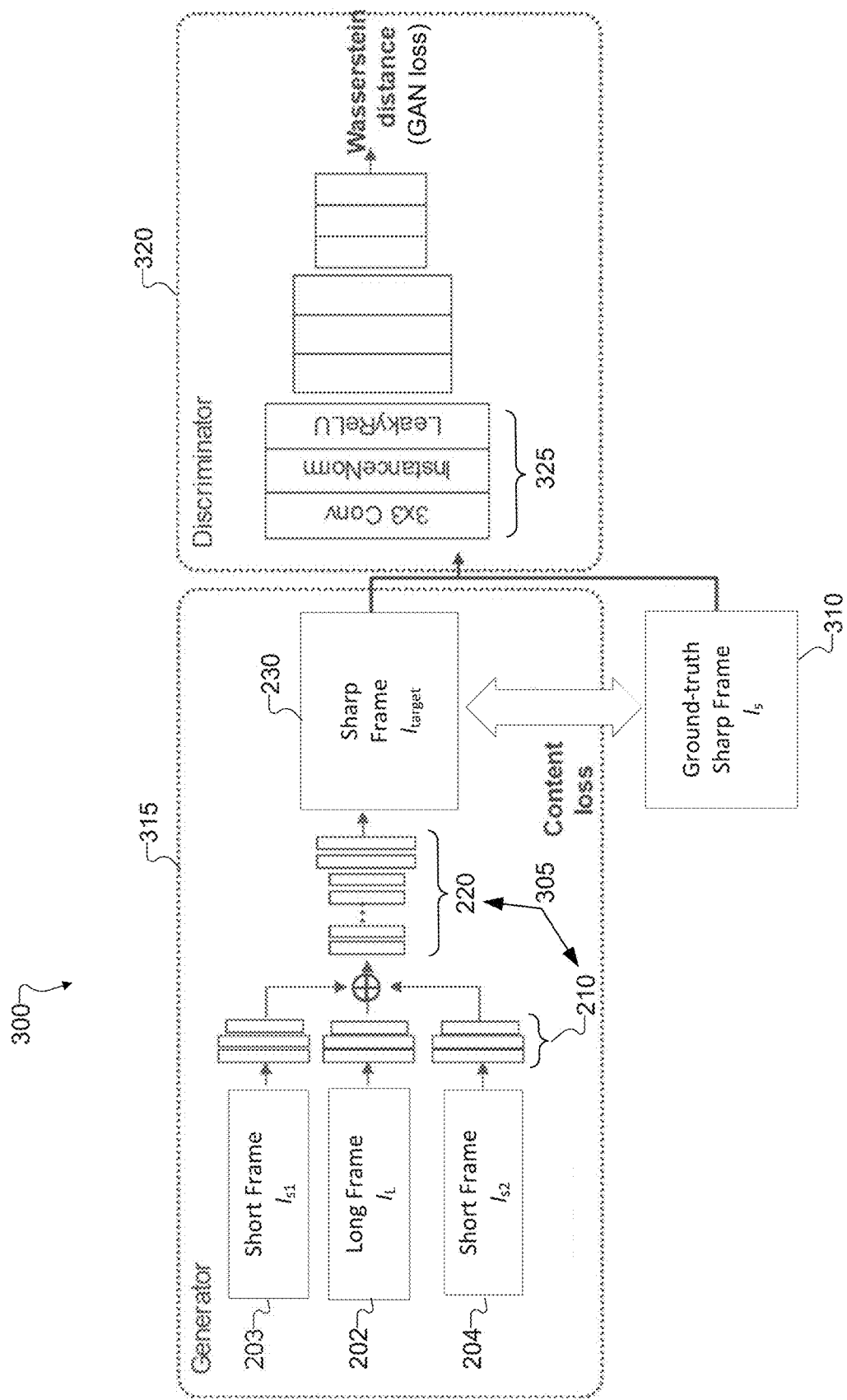
FIG. 3 illustrates an example process for training a convolutional neural network in accordance with this disclosure.

FIG. 3 illustrates an example process 300 for training a convolutional neural network in accordance with this disclosure. Using the process 300, a convolutional neural network 305 can be trained for motion warping using multi-exposure image frames. For ease of explanation, the process 300 is described as involving the use of the electronic device 101 of FIG. 1 and some of the components depicted in the process 200 of FIG. 2. However, the process 300 could be used with any other suitable device and any other suitable convolutional neural network architecture.

During the training process 300, the electronic device 101 trains the convolutional neural network 305, which includes the encoder networks 210, the decoder network 220, or a combination of these. The training process 300 is performed to help define what a sharp frame 230 should look like. In order to perform the training process 300, the electronic device 101 obtains training data, which includes one or more long frames 202 and multiple short frames 203-204 associated with each long frame 202. If the training data simply included long and short frames, it would be difficult or impossible to define ground truths, since the long and short frames may not represent the ground truths. Thus, the electronic device 101 also obtains a ground-truth sharp frame 310 associated with each long frame 202. A method for obtaining the training data (including the long frames 202, short frames 203-204, and ground-truth sharp frames 310) is described below in conjunction with FIG. 4.

As shown in FIG. 3, the training process 300 uses a GAN training architecture, which includes a generator 315 and a discriminator 320. The generator 315 receives the input information and generates the desired output, which in this case is represented by the restored sharp frame 230. The discriminator 320 determines whether or not the desired output is believable or accurate. The electronic device 101 performs the functions of the generator 315 and the discriminator 320 to train the convolutional neural network 305 in an end-to-end fashion. In some embodiments, the discriminator 320 can include multiple functions 325, including a convolutional layer, a normalization function, and a rectified linear unit (ReLU) function.

The electronic device 101 trains the convolutional neural network 305 by operating in an iterative manner to generate the restored sharp frame 230. Ideally, during multiple iterations through the training process 300, the convolutional neural network 305 generally improves the generation of the restored sharp frames 230 and moves towards producing the ground-truth sharp frames 310.

For each iteration through the training process 300, the electronic device 101 may perform a loss computation function, which computes a total loss function for the convolutional neural network 305. The loss helps guide updating of weights of the convolutional neural network 305. For example, the electronic device 101 can compute the total loss function according to the following:

$$L=\lambda L_{content}+L_{GAN}$$

where L is the total loss function, λ is a training parameter set to achieve a goal of balancing content loss and GAN loss, $\lambda L_{content}$ is the content loss, and $L_{GAN}$ is the GAN loss. Content loss is a measurement of the difference between a ground-truth sharp frame 310 and a restored sharp frame 230. In some embodiments, the content loss can be L1 or L2 loss. The GAN loss can be any standard adversarial loss. For example, as shown in FIG. 3, the GAN loss can be the Wasserstein distance, which is a distance measurement (or loss measurement) used in Wasserstein GANs.

Based on the computed loss, the electronic device 101 adjusts the convolutional neural network 305 by updating the weights used by the convolutional neural network 305. For example, the electronic device 101 can alter the weights used in the generator 315, the discriminator 320, or other parameters of the convolutional neural network 305. Once the updated weights are determined, the electronic device 101 performs another iteration of training for the convolutional neural network 305. The overall goal of the training process 300 is to reduce or minimize the value of the loss function.

Although FIG. 3 illustrates one example of a process 300 for training a convolutional neural network, various changes may be made to FIG. 3. For example, the convolutional neural network 305 may be trained in any other suitable manner, which may or may not involve the use of a generator and a discriminator.

Figure 4:
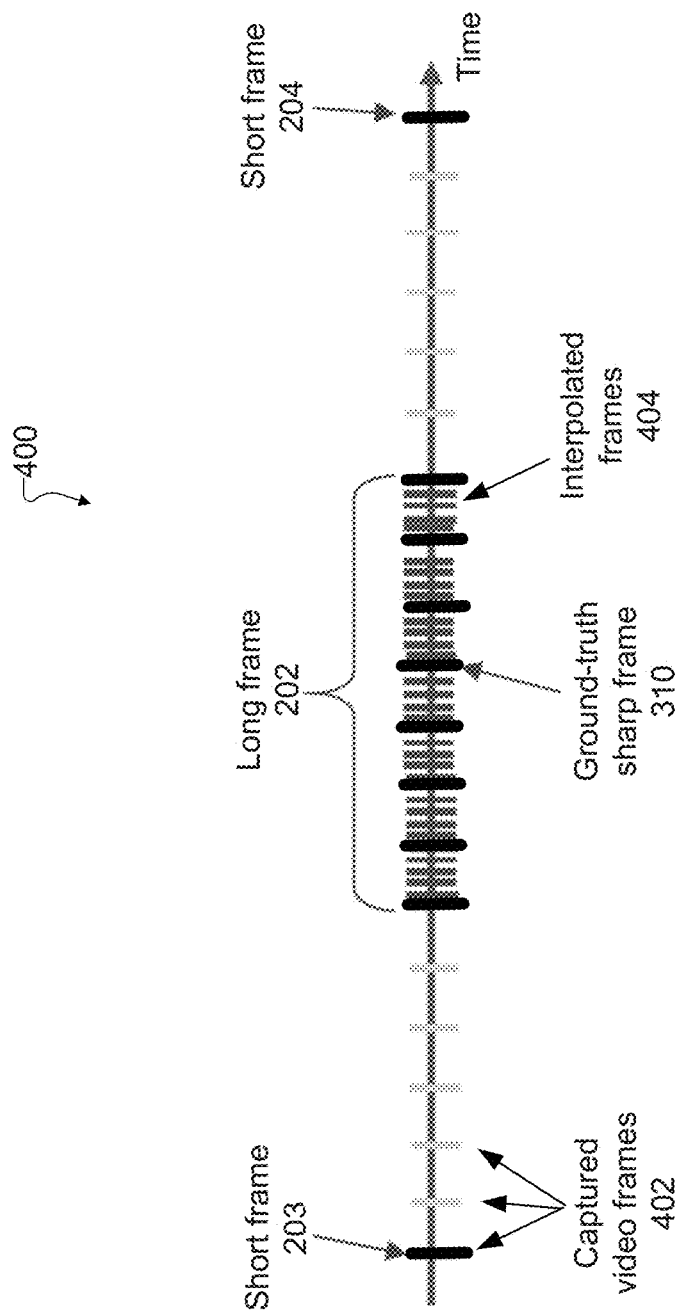
FIG. 4 illustrates an example process for generating training data for the training process of FIG. 3 in accordance with this disclosure.

FIG. 4 illustrates an example process 400 for generating training data for the training process 300 of FIG. 3 in accordance with this disclosure. In particular, the process 400 can be used for generating long frames, short frames, and ground-truth sharp frames to be used as training data. For ease of explanation, the process 400 is described as involving the use of the electronic device 101 of FIG. 1 and the process 300 of FIG. 3. However, the process 400 could be used with any other suitable device and any other suitable network training process.

As shown in FIG. 4, an image sensor of the electronic device 101 (such as a high-speed camera) captures multiple video frames 402 in a burst over a short period of time (such as 100-150 milliseconds). The video frames 402 depict movement of at least one object over the time burst. In some embodiments, the video frames 402 may be captured at 240 frames per second.

The electronic device 101 selects two of the video frames 402 captured at different times to become the short frames 203-204. In FIG. 4, the end frames of the captured video frames 402 are selected as the short frames 203-204. However, in other embodiments, other frames among the captured video frames 402 could be selected as the short frames 203-204. The electronic device 101 also selects one of the captured video frames 402 at or near the middle point of the burst as the ground-truth sharp frame 310.

To obtain the long frame 202 (which includes realistic motion blurred portions), the electronic device 101 blends multiple image frames together. To get a larger sample for blending that includes more representations of object movement, the electronic device 101 generates multiple interpolated frames 404 (represented in FIG. 4 as slightly shorter lines) by interpolating pairs of adjacent video frames 402. Once the interpolated frames 404 are generated over a time span (such as 50-100 milliseconds) within the burst, the electronic device 101 averages the video frames 402 and their corresponding interpolated frames 404 over the time span to create the synthesized long frame 202 with realistic motion blur as shown in FIG. 4.

The resulting long frame 202, the short frames 203-204, and the ground-truth sharp frame 310 can be used as one set of training data for the training process 300. Additional training data can be generated by shifting the examined sample shown in FIG. 4 to the left or right by one or more captured video frames 402. Even more additional training data can be generated by repeating the process 400 with additional captured video frames 402.

Although FIG. 4 illustrates one example of a process 400 for generating training data, various changes may be made to FIG. 4. For example, the number of captured video frames and interpolated frames comprising the long frame can be greater or fewer than shown in FIG. 4.

Figure 5:
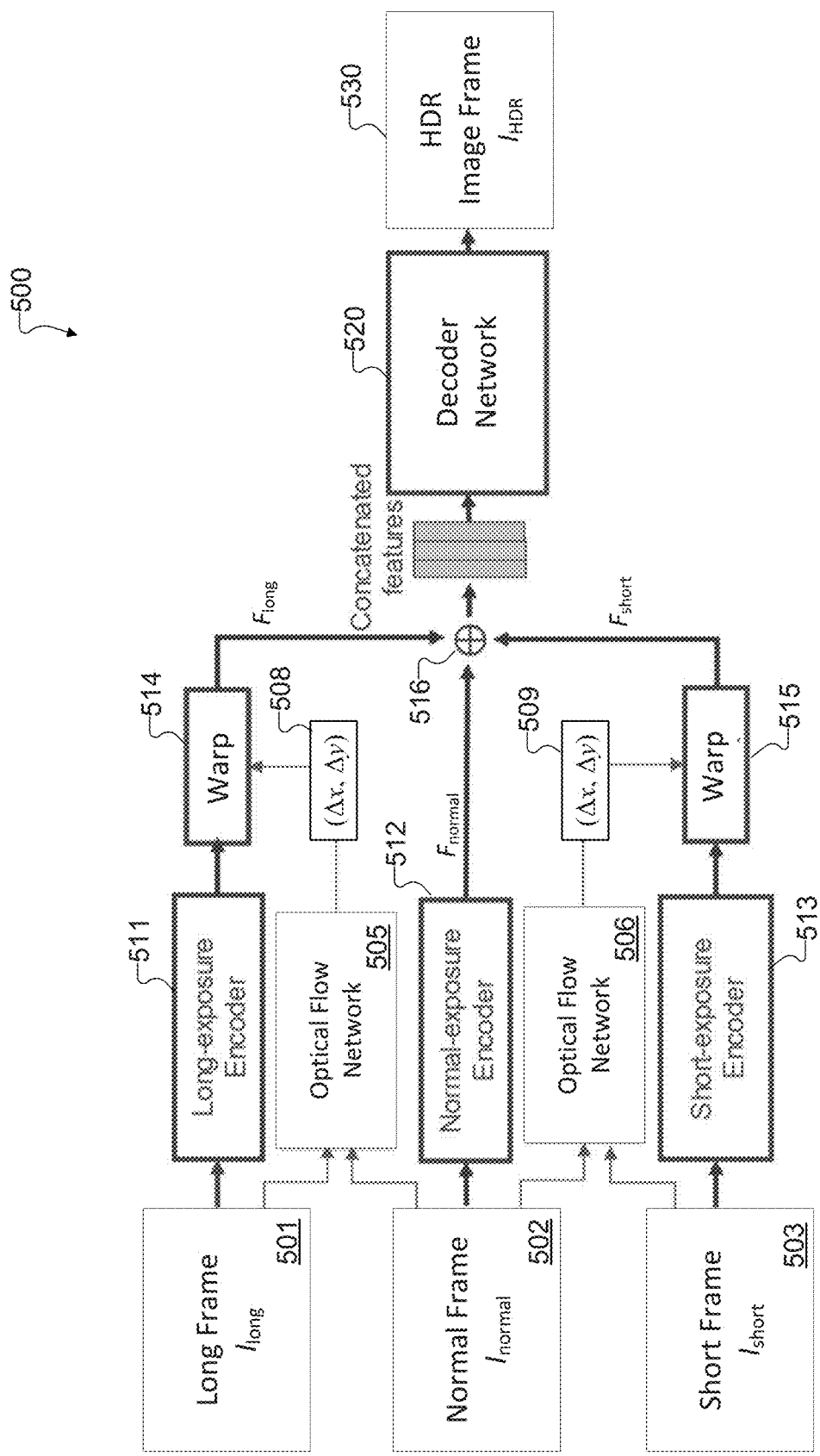
FIG. 5 illustrates an example process for motion warping using multi-exposure image frames to produce a high dynamic range (HDR) frame in accordance with this disclosure.

FIG. 5 illustrates an example process 500 for motion warping using multi-exposure image frames to produce an HDR frame in accordance with this disclosure. For ease of explanation, the process 500 is described as involving the use of the electronic device 101 of FIG. 1 and multiple components that are the same as, or similar to, components shown in FIG. 2. However, the process 500 could be used with any other suitable device and components.

As shown in FIG. 5, the electronic device 101 receives or obtains multiple image frames 501, 502, 503 of a scene captured at approximately the same moment using at least one camera or other image sensor 180 of the electronic device 101. The image frame 501 of the scene (also referred to as "long frame $I_{long}$") is captured using a long exposure time. The image frame 502 (also referred to as "normal frame $I_{normal}$") is captured using a normal exposure time. The image frame 503 (also referred to as "short frame $I_{short}$") is captured using a short exposure time. Generally speaking, the long frame 501 is useful for capturing dark or shadow areas, the normal frame 502 captures details in a subject of the scene, and the short frame 503 captures bright areas. The electronic device 101 uses the normal frame 502 as a reference frame and uses the long frame 501 and short frame 503 as non-reference frames.

The electronic device 101 inputs each of the three image frames 501, 502, 503 to a respective encoder network 511, 512, 513, which may be the same as or similar to the encoder networks 210 of FIG. 2. As an example, the components of the encoder networks 511, 512, 513 could be the same as the encoder networks 210, but the trained parameters of the encoder networks 511, 512, 513 could be different from those of the encoder networks 210. The output of each encoder network 511, 512, 513 is a feature map for that exposure level ($F_{long}$, $F_{normal}$, $F_{short}$), where the feature map includes a number of identified features.

The electronic device 101 also provides the non-reference long frame 501 and the reference normal frame 502 to a first optical flow network 505 for optical flow estimation. Similarly, the electronic device 101 provides the non-reference short frame 503 and the reference normal frame 502 to a second optical flow network 506 for optical flow estimation. The optical flow network 505 determines an optical flow map 508 from the long frame 501 to the normal frame 502, and the optical flow network 506 determines an optical flow map 509 from the short frame 503 to the normal frame 502. Each of the optical flow networks 505 and 506 may be the same as or similar to the optical flow network 206 of FIG. 2.

To align the feature maps $F_{long}$, $F_{short}$ generated from the long frame 501 and the short frame 503, respectively, with the feature map $F_{normal}$ from the normal frame 502, the electronic device 101 performs warping operations 514-515, which may be the same as or similar to the warping operations 214-215 of FIG. 2. The warping operations 514-515 result in translated feature maps that are aligned with each other. The electronic device 101 combines the aligned features using a concatenator operation 516 and then inputs the combined features into a decoder network 520.

The decoder network 520 is trained to select features from the different feature maps $F_{long}$, $F_{normal}$, $F_{short}$, which are associated with different exposure levels, and blend the features to generate an HDR image frame 530 (referred to as $I_{HDR}$). In some embodiments, the decoder network 520 applies an HDR blending algorithm to the feature maps in order to generate the HDR image frame 530 with reduced or minimal blur since the feature maps are well-aligned. The decoder network 520 may use any suitable blending technique or algorithm to generate an HDR image frame 530 based on multiple feature maps.

Although FIG. 5 illustrates one example of a process 500 for motion warping using multi-exposure image frames to produce an HDR frame, various changes may be made to FIG. 5. For example, more than one long frame or short frame may be used as non-reference frames in the process 500.

Figure 6:
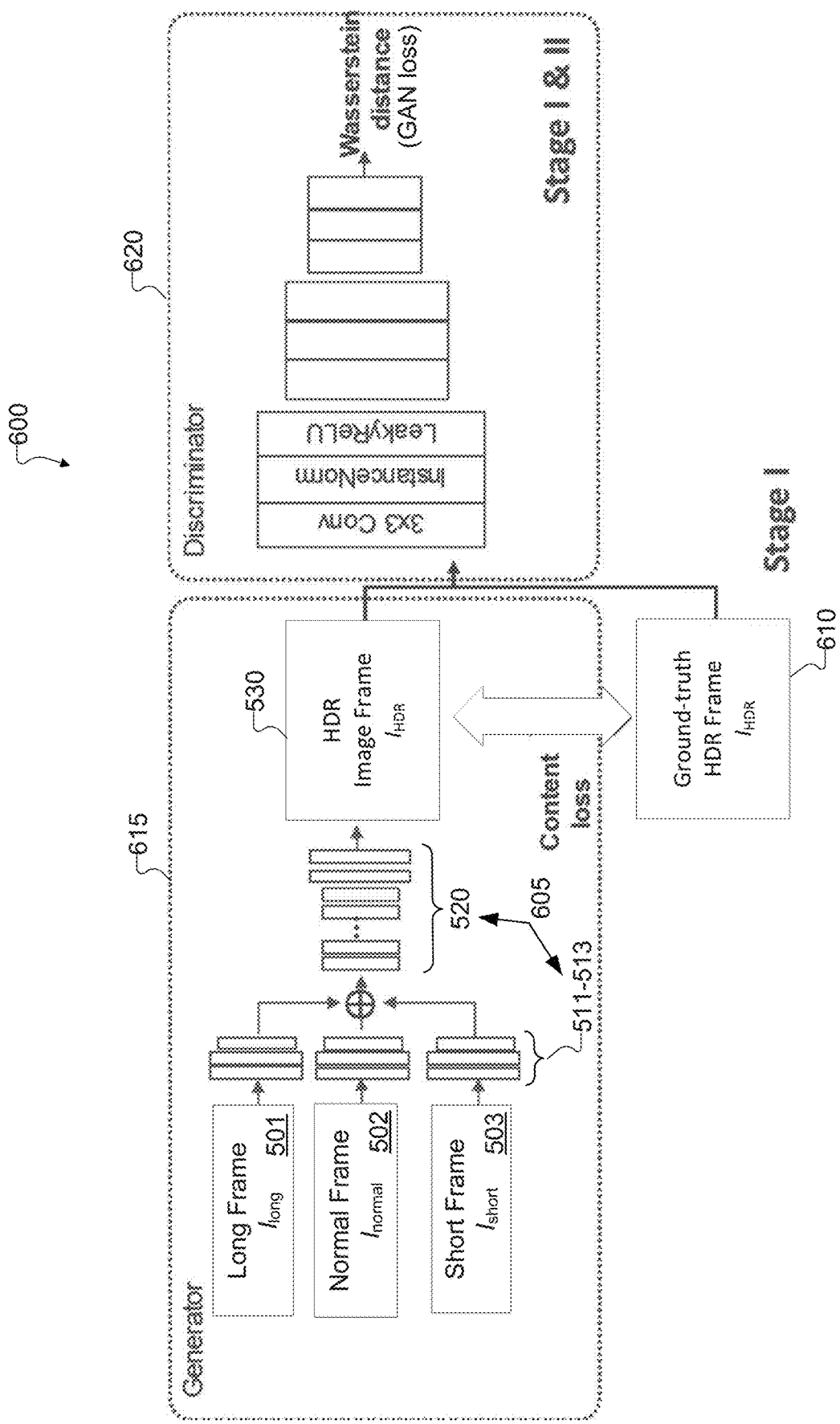
FIG. 6 illustrates another example process for training a convolutional neural network in accordance with this disclosure.

FIG. 6 illustrates another example process 600 for training a convolutional neural network in accordance with this disclosure. Using the process 600, a convolutional neural network 605 can be trained for motion warping using multi-exposure image frames to produce an HDR frame. For ease of explanation, the process 600 is described as involving the use of the electronic device 101 of FIG. 1 and some of the components depicted in the process 500 of FIG. 5. However, the process 600 could be used with any other suitable device and any other suitable convolutional neural network architecture.

During the training process 600, the electronic device 101 trains the convolutional neural network 605, which includes the encoder networks 511, 512, 513, the decoder network 520, or a combination of these. In order to perform the training process 600, the electronic device 101 obtains training data, which includes one or more long frames 501, one or more normal frames 502, and one or more short frames 503. In some embodiments, at least some of the training data can be generated using the process 400 of FIG. 4 or a similar process.

As shown in FIG. 6, the training process 600 uses a GAN training architecture, which includes a generator 615 and a discriminator 620. These may be the same as or similar to corresponding components of FIG. 3. The challenge in HDR is creating one or more ground-truth HDR frames 610 to be used to define content loss. This is solved by performing the training process 600 in two stages.

In the first stage ("Stage I"), the electronic device 101 trains the convolutional neural network 605 in an end-to-end fashion (training the generator and discriminator together) using both GAN loss (such as the Wasserstein distance) and content loss similar to the training process 500. The frames 501, 502, 503 used as training samples in the first stage are selected to have only static scenes, since it is easier to create ground-truth HDR frames 610 from static scenes. In the second stage ("Stage II"), the electronic device 101 fine-tunes the convolutional neural network 605 using only GAN loss. In the second stage, the frames 501, 502, 503 selected as training samples include scenes that contain moving objects. Since the second stage of the training process 600 uses only the GAN loss (no content loss), ground-truth HDR frames 610 are not needed for fine tuning.

Although FIG. 6 illustrates one example of a process 600 for training a convolutional neural network, various changes may be made to FIG. 6. For example, the convolutional neural network 605 may be trained in any other suitable manner, which may or may not involve the use of a generator and a discriminator.

Figure 7:
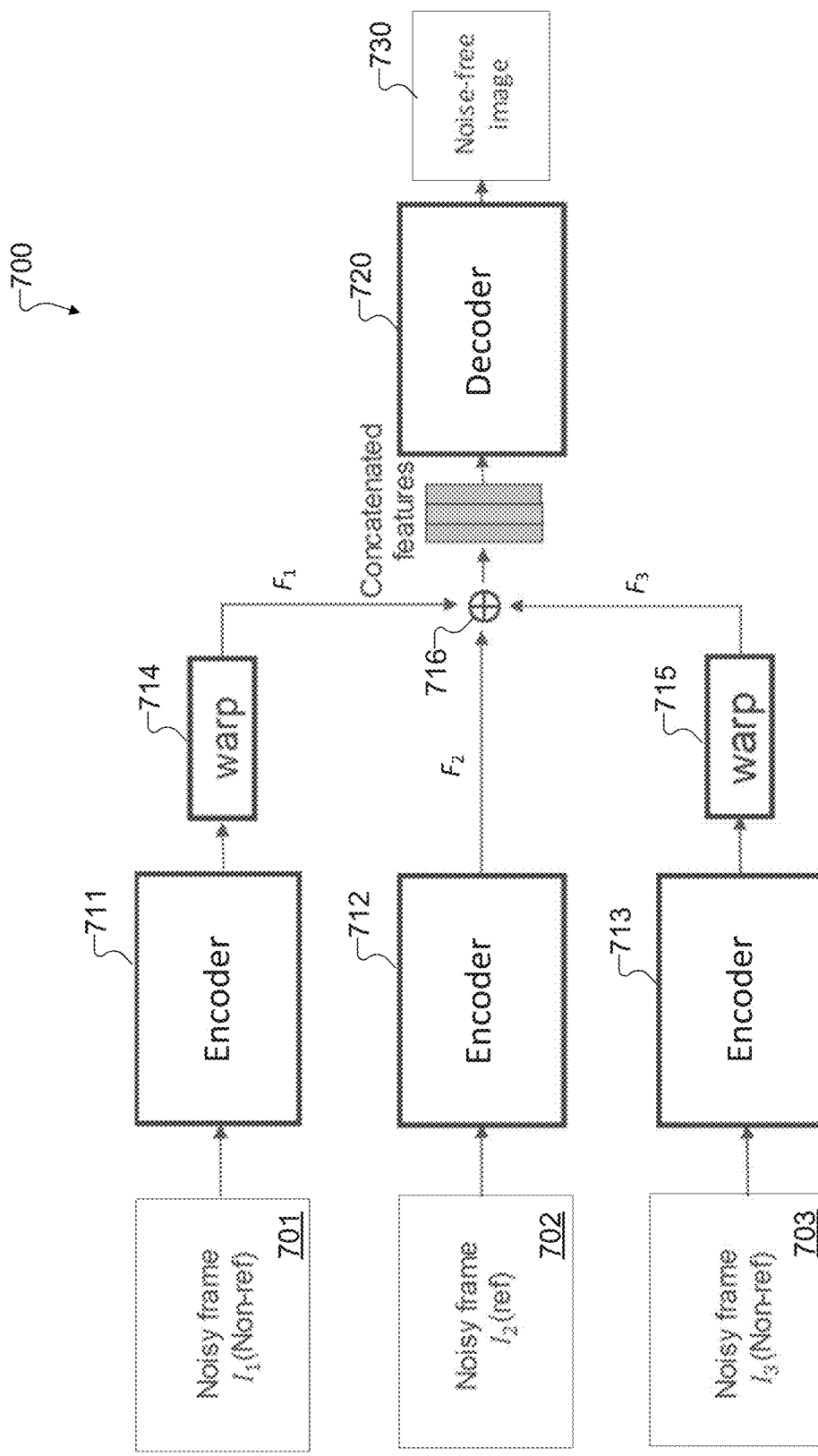
FIG. 7 illustrates an example process for denoising using multiple image frames in accordance with this disclosure.

FIG. 7 illustrates an example process 700 for denoising using multiple image frames in accordance with this disclosure. The process 700 can be used for denoising when a scene contains moving objects. For ease of explanation, the process 700 is described as involving the use of the electronic device 101 of FIG. 1 and multiple components that may be the same as or similar to components shown in FIG. 2. However, the process 700 could be used with any other suitable device and components.

As shown in FIG. 7, the electronic device 101 receives or obtains multiple image frames 701, 702, 703 of a scene captured at approximately the same moment using at least one camera or other image sensor 180 of the electronic device 101. Each of the image frames 701, 702, 703 is "noisy," meaning there is noise present in each of the image frames 701, 702, 703. All of the image frames 701, 702, 703 can have the same exposure level. Among the image frames 701, 702, 703, the electronic device 101 selects the image frame 702 as the reference frame. The image frame 702 could be selected because it is the sharpest image of the image frames 701, 702, 703, because it is the frame captured in the middle temporally, or because it is selected at random. In general, any desired selection technique may be used here. The electronic device 101 uses the other image frames 701 and 703 as non-reference frames.

The electronic device 101 inputs each of the three image frames 701, 702, 703 to a respective encoder network 711, 712, 713, which may be the same as or similar to the encoder networks 210 of FIG. 2. The output of each encoder network 711, 712, 713 is a feature map corresponding to that image frame ($F_1$, $F_2$, $F_3$), where the feature map includes a number of identified features.

To align the feature maps $F_1$, $F_3$ generated from the image frames 701 and 703, respectively, with the feature map $F_2$ from the reference image frame 702, the electronic device 101 performs warping operations 714-715, which may be the same as or similar to the warping operations 214-215 of FIG. 2. The wailing operations 714-715 result in translated feature maps that are aligned with each other. The electronic device 101 combines the aligned features using a concatenator operation 716 and inputs the combined features into a decoder network 720. The decoder network 720 is trained to select features from the different feature maps $F_1$, $F_2$, $F_3$ and blend the features to generate a noise-free image frame 730 (or at least a noise-reduced image). In some embodiments, the training can be performed similar to the training process 600 of FIG. 6, since there may be no good ground truth images available.

Although FIG. 7 illustrates one example of a process 700 for denoising using multiple image frames, various changes may be made to FIG. 7. For example, more than two noisy frames may be used as non-reference image frames in the process 700.

Figure 8B:
FIGS. 8A and 8B illustrate examples of benefits that can be realized using one or more of the embodiments of this disclosure.
Figure 8A:

FIGS. 8A and 8B illustrate examples of benefits that can be realized using one or more of the embodiments of this disclosure. More specifically, FIGS. 8A and 8B depict a comparison between an image 801 of a scene captured using conventional image processing and an image 802 of the same scene captured using one of the embodiments described above. In FIG. 8A, the image 801 was captured and processed using a conventional image operation. As evident by FIG. 8A, the image 801 exhibits significant blurring around the subject's arm 803 and shirt logo 804. In contrast, the image 802 in FIG. 8B was captured and processed using the deblurring operations as described above. The resulting image 802 provides superior results compared to the image 801, particularly around the subject's arm 803 and shirt logo 804. In the images 801-802, the subject's face is obscured for privacy.

Although FIGS. 8A and 8B illustrate examples of benefits that can be realized using one or more of the embodiments of this disclosure, various changes may be made to FIGS. 8A and 8B. For example, images can be captured of numerous scenes under different lighting conditions, and these figures do not limit the scope of this disclosure. These figures are merely meant to illustrate example types of benefits that might be obtainable using the techniques described above.

Figure 9:
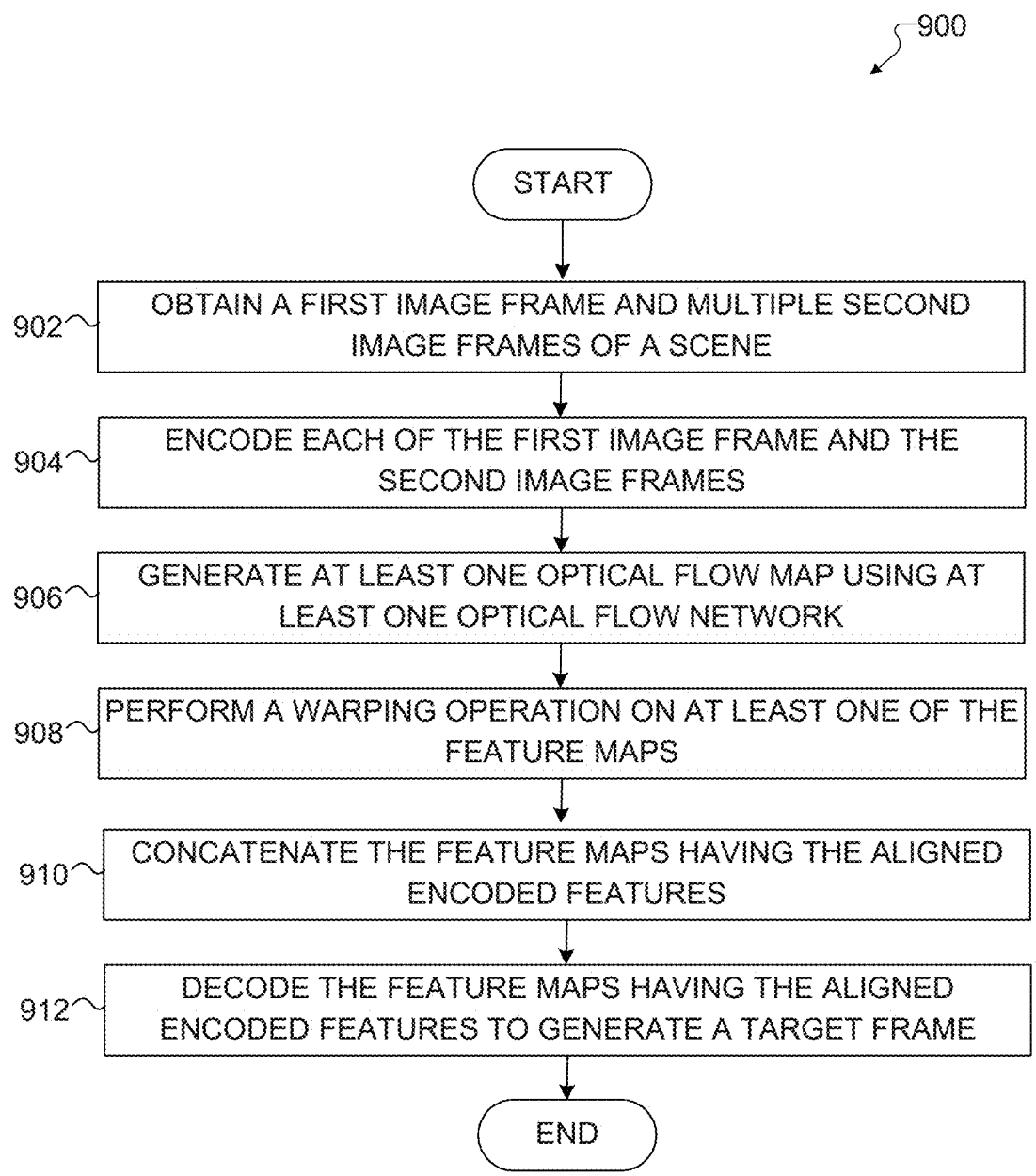
FIG. 9 illustrates an example method for motion warping using multiple image frames in accordance with this disclosure.

FIG. 9 illustrates an example method 900 for motion warping using multiple image frames in accordance with this disclosure. For ease of explanation, the method 900 shown in FIG. 9 is described as involving the use of the electronic device 101 of FIG. 1. However, the method 900 shown in FIG. 9 could be used with any other suitable electronic device and in any suitable system.

As shown in FIG. 9, a first image frame and multiple second image frames of a scene are obtained using at least one image sensor of an electronic device at step 902. Each of the second image frames has an exposure time different from an exposure time of the first image frame. This could include, for example, the processor 120 of the electronic device 101 receiving a capture request and causing a camera (sensor 180) to capture multiple image frames, such as the image frames 202, 203, 204 or the image frames 501, 502, 503. In some embodiments, the exposure time of each image frame is shorter than the exposure time of the first image frame. For example, the exposure time of the short frames 203-204 is shorter than the exposure time of the long frame 202. In other embodiments, one of the second image frames has an exposure time that is longer than the exposure time of the first image frame, and another of the second image frames has an exposure time that is shorter than the exposure time of the first image frame. For instance, the long frame 501 has an exposure time that is longer than the exposure time of the normal frame 502, and the short frame 503 has an exposure time that is shorter than the exposure time of the normal frame 502.

Each of the first image frame and the second image frames is encoded to generate a corresponding feature map at step 904. In some embodiments, the encoding is performed using a convolutional neural network, which may include a generative adversarial network. This could include, for example, the electronic device 101 encoding each of the image frames 202, 203, 204 using the encoder networks 210 or encoding each of the image frames 501, 502, 503 using the encoder networks 511, 512, 513.

At least one optical flow network is used to generate at least one optical flow map representing pixel-wise differences between at least one pair of frames among the first image frame and the second image frames at step 906. This could include, for example, the electronic device 101 using the optical flow network 206 to generate the optical flow map 208 or using the optical flow networks 505-506 to generate the optical flow maps 508-509. A warping operation is performed on at least one of the feature maps using the at least one optical flow map at step 908. This could include, for example, the electronic device 101 performing the warping operations 214-215 using the optical flow map 208 or performing the warping operations 514-515 using the optical flow maps 508-509.

The feature maps having the aligned encoded features are concatenated at step 910. This could include, for example, the electronic device 101 performing the concatenator operation 216 or the concatenator operation 516. The feature maps having the aligned encoded features are decoded at step 912 using the convolutional neural network in order to generate a target image frame of the scene. This could include, for example, the electronic device 101 decoding the aligned feature maps using the decoder network 220 or the decoder network 520 to generate the sharp frame 230 or the HDR image frame 530.

Although FIG. 9 illustrates one example of a method 900 for motion warping using multiple image frames, various changes may be made to FIG. 9. For example, while shown as a series of steps, various steps in FIG. 9 could overlap, occur in parallel, occur in a different order, or occur any number of times.

Blind motion deblurring is another type of deblurring operation that can be performed for images captured in dim lighting. Blind motion deblurring is typically most successful when non-uniform blur kernels are accurately estimated. Some approaches use three consecutive blurry frames and attempt to determine per-pixel kernels by bi-linearly interpolating optical flows between two neighboring blurry frames. However, such methods often fail to accurately estimate the optical flow between two blurry frames. Moreover, such approaches may not successfully restore background regions that are occluded by moving objects. To address these and other issues, the following embodiment includes two or more sharp short-exposure frames that are captured before and after a target long-exposure frame so that kernel estimation is much more accurate.

Figure 10:
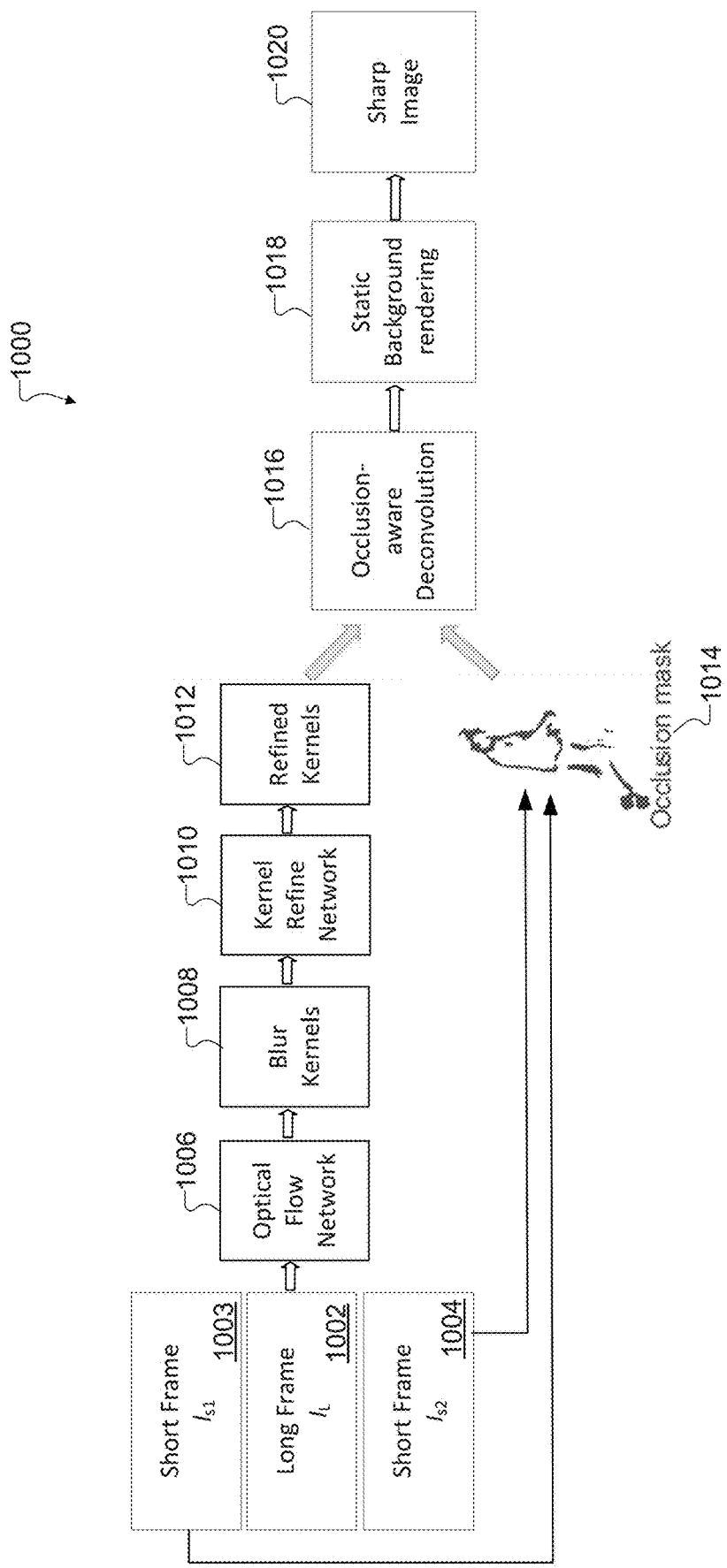
FIG. 10 illustrates an example process for removing motion blur using multi-exposure image frames in accordance with this disclosure.

FIG. 10 illustrates an example process 1000 for removing motion blur using multi-exposure image frames in accordance with this disclosure. For ease of explanation, the process 1000 shown in FIG. 10 is described as involving the use of the electronic device 101 of FIG. 1 and multiple components that are the same as, or similar to, components shown in FIG. 2. However, the process 1000 could be used with any other suitable device and components.

As shown in FIG. 10, the electronic device 101 receives or obtains multiple image frames 1002, 1003, 1004 of a scene captured at approximately the same moment using at least one camera or other image sensor 180 of the electronic device 101. The image frame 1002 of the scene (also referred to as "long frame $I_L$") is captured using a long exposure time. The image frames 1003-1004 of the scene (also referred to as "short frame $I_{s1}$" and "short frame $I_{s2}$," respectively) are captured using a short exposure time. As in some of the embodiments described above, the long frame 1002 includes blurry sections.

The electronic device 101 provides the image frames 1002, 1003, 1004 to an optical flow network 1006 for optical flow estimation. The electronic device 101 uses the optical flow network 1006 to compute the optical flow (motion) between the two short frames 1003-1004 and to compute blur kernels 1008 that approximate the motion direction for the long frame 1002. The blur kernels 1008 represent deconvolution kernels, which are a spatially varying set of filter kernels that can be used to sharpen an image. Each blur kernel 1008 can be computed by interpolating the optical flow at each pixel. For example, assume that the optical flow at pixel (x, y) is (u, v). The optical flow network 1006 can operate by interpolating the optical flow into a blur kernel k according to the following:

$$k(i, j) = \begin{cases} 1 & \text{if } |i| < \frac{u}{2}, |j| < \frac{v}{2}, i*v == j*u \\ 0 & \text{otherwise} \end{cases}.$$

After the blur kernels 1008 are generated, the electronic device 101 provides the blur kernels 1008 to a kernel refine network 1010 in order to refine the blur kernels 1008. The kernel refine network 1010 is a convolutional neural network that operates to refine the blur kernels 1008 to fit an accurate exposure time window for the long frame 1002. The kernel refine network 1010 may include multiple convolution layers (such as 3×3 convolution layers) followed by multiple transposed convolutional layers (such as 3×3 transposed convolution layers). The output of the kernel refine network 1010 is multiple refined kernels 1012. In some embodiments, the kernel refine network 1010 can be trained using reblur loss by enforcing a ground-truth sharp image, when convolved with an estimated kernel, to be the same as a blur input. In some cases, this can be expressed in the following manner:

$$\hat{k} = \underset{k}{\operatorname{argmin}} \| I_{sharp} * k - I_{blur} \|^2$$

where $I_{sharp}$ is the ground-truth sharp image, k is the estimated kernel, and $I_{blur}$ is the blur input.

The electronic device 101 also estimates an occlusion mask 1014 for each of the short frames 1003-1004. Each occlusion mask 1014 estimates the background objects that are partially occluded by a moving object. The occlusion masks 1014 will be applied to the short frames 1003-1004 to recover lost background in the long frame 1002 as discussed below. The electronic device 101 can use any suitable technique for occlusion mask estimation.

The electronic device 101 further performs an occlusion-aware deconvolution operation 1016. The occlusion-aware deconvolution operation 1016 is performed to recover the blurred object by applying the refined kernels 1012 to the long frame 1002 and restoring the occluded background area by applying occlusion masks 1014 to the short frames 1003-1004. For example, given the image frames 1002, 1003, 1004 (identified below as $I_L$, $I_{s1}$, and $I_{s2}$) and the occlusion masks 1014 (identified below as $M_1$ and $M_2$) as inputs, the motion blur problem can be modeled as:

$$I_L = I_{sharp} * K + M_1 \odot I_{s1} + M_2 \odot I_{s2}.$$

Since the blur kernels k and the occlusion masks $M_1$ and $M_2$ are fixed, only the sharp image (identified below as $I_{sharp}$) needs to be recovered, which can be expressed as follows:

$$I'_L = I_L - M_1 \odot I_{s1} - M_2 \odot I_{s2}$$

$$I'_L = I_{sharp} * K$$

The objective function to estimate $I_{sharp}$ may be expressed as follows, where a primal-dual update can be used to optimally compute $\hat{I}_{sharp}$.

$$\hat{I}_{sharp} = \underset{I_{sharp}}{\min} \sum_{\partial} \| \partial K I_{sharp} - \partial I'_L \|^2 + |\nabla I_{sharp}|$$

In addition, the electronic device 101 performs a static background rendering 1018 to render the static background of the sharp image. For example, according to the per-pixel kernels, the electronic device 101 can estimate a static background mask M and apply alpha blending between the long frame 1002 ($I_L$) and the estimated $\hat{I}_{sharp}$ to transfer the high-quality background from the input to a restored sharp image frame 1020.

Although FIG. 10 illustrates one example of a process 1000 for removing motion blur using multi-exposure image frames, various changes may be made to FIG. 10. For example, more than two short frames may be used as non-reference frames in the process 1000.

Figure 11B:
FIGS. 11A and 11B illustrate more examples of benefits that can be realized using one or more of the embodiments of this disclosure.
Figure 11A:
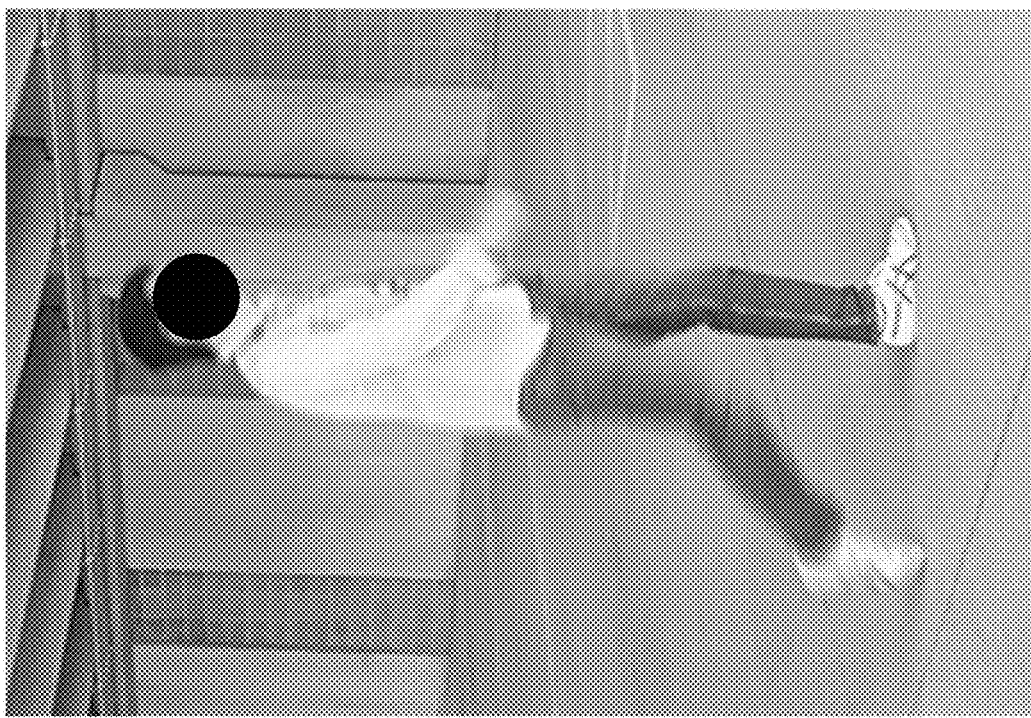

FIGS. 11A and 11B illustrate examples of benefits that can be realized using one or more of the embodiments of this disclosure. More specifically, FIGS. 11A and 11B depict a comparison between an image 1101 of a scene captured using conventional image processing and an image 1102 of the same scene captured using the embodiment disclosed in FIG. 10. In FIG. 11A, the image 1101 was captured and processed using a conventional image operation. As evident by FIG. 11A, the image 1101 exhibits significant blurring around the subject's hand and leg. In contrast, the image 1102 in FIG. 11B was captured and processed using the deblurring operations as described above. The resulting image 1102 provides superior results compared to the image 1101, particularly around the subject's hand and leg. In the images 1101-1102, the subject's face is obscured for privacy.

Although FIGS. 11A and 11B illustrate examples of benefits that can be realized using one or more of the embodiments of this disclosure, various changes may be made to these figures. For example, images can be captured of numerous scenes under different lighting conditions, and these figures do not limit the scope of this disclosure. These figures are merely meant to illustrate example types of benefits that might be obtainable using the techniques described above.

Figure 12:
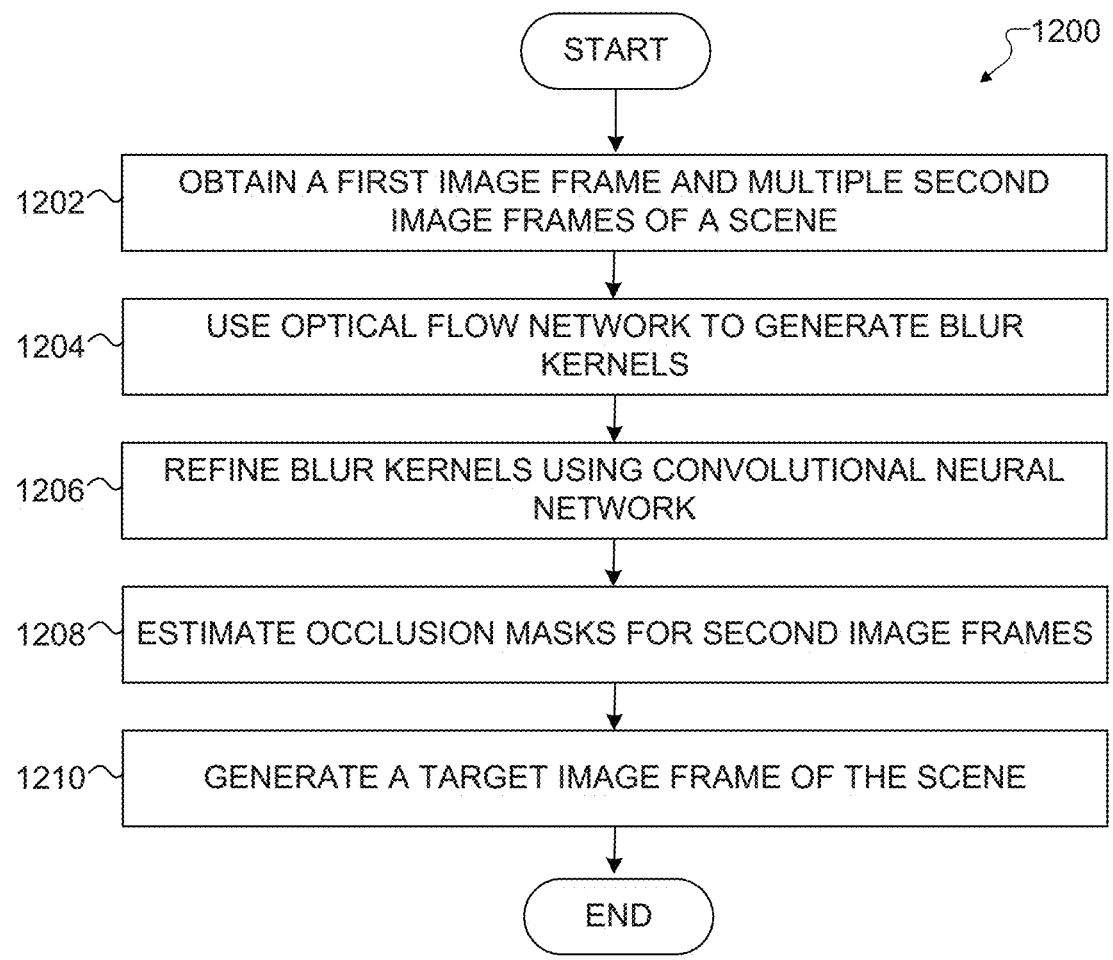
FIG. 12 illustrates an example method for removing motion blur using multi-exposure image frames in accordance with this disclosure.

FIG. 12 illustrates an example method 1200 for removing motion blur using multi-exposure image frames in accordance with this disclosure. For ease of explanation, the method 1200 shown in FIG. 12 is described as involving the use of the electronic device 101 of FIG. 1. However, the method 1200 shown in FIG. 12 could be used with any other suitable electronic device and in any suitable system.

As shown in FIG. 12, a first image frame and multiple second image frames of a scene are obtained using at least one image sensor of an electronic device at step 1202. Each of the second image frames has an exposure time different from the first image frame. This could include, for example, the processor 120 of the electronic device 101 receiving a capture request and causing a camera (sensor 180) to capture multiple image frames, such as the image frames 1002, 1003, 1004. In some embodiments, the exposure time of each second image frame is shorter than the exposure time of the first image frame. For example, the exposure time of the short frames 1003-1004 is shorter than the exposure time of the long frame 1002.

An optical flow network is used to generate blur kernels indicating a motion direction of the first image frame at step 1204. This could include, for example, the electronic device 101 using the optical flow network 1006 to generate the blur kernels 1008. The blur kernels are refined using a convolutional neural network at step 1206. This could include, for example, the electronic device 101 using the kernel refine network 1010 to generate the refined kernels 1012 from the blur kernels 1008. Occlusion masks are estimated for the second image frames at step 1208. This could include, for example, the electronic device 101 estimating the occlusion masks 1014 for the short frames 1003-1004.

A target image frame of the scene is generated using the refined blur kernels and occlusion masks for the second image frames at step 1210. This could include, for example, the electronic device 101 generating the sharp image frame 1020 using the refined kernels 1012 and the occlusion masks 1014. In some embodiments, the target image frame is generated by (i) performing an occlusion-aware deconvolution operation using the refined blur kernels and occlusion masks and (ii) rendering a static background of the target image frame, such as described with respect to the occlusion-aware deconvolution operation 1016 and the background rendering operation 1018.

Although FIG. 12 illustrates one example of a method 1200 for removing motion blur using multi-exposure image frames, various changes may be made to FIG. 12. For example, while shown as a series of steps, various steps in FIG. 12 could overlap, occur in parallel, occur in a different order, or occur any number of times.

It should be noted that while various operations are described above as being performed using one or more devices, those operations can be implemented in any suitable manner. For example, each of the functions in the electronic device 101 or server 106 can be implemented or supported using one or more software applications or other software instructions that are executed by at least one processor 120 of the electronic device 101 or server 106. In other embodiments, at least some of the functions in the electronic device 101 or server 106 can be implemented or supported using dedicated hardware components. In general, the operations of each device can be performed using any suitable hardware or any suitable combination of hardware and software/firmware instructions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining, using at least one image sensor of an electronic device, a first image frame and multiple second image frames of a scene, each of the second image frames having an exposure time different from an exposure time of the first image frame;
    generating, using at least one processor, blur kernels indicating a motion direction of the first image frame using an optical flow network, wherein the optical flow network determines an optical flow between the multiple second image frames in order to generate the blur kernels for the first image frame;
    refining, using the at least one processor, the blur kernels using a convolutional neural network; and
    generating, using the at least one processor, a target image frame of the scene using the refined blur kernels and occlusion masks for the second image frames.

2. The method of claim 1, wherein generating the target image frame of the scene comprises:
    performing an occlusion-aware deconvolution operation using the refined blur kernels and the occlusion masks; and
    rendering a static background of the target image frame.

3. The method of claim 1, wherein the exposure time of each second image frame is shorter than the exposure time of the first image frame.

4. The method of claim 1, wherein generating the blur kernels comprises interpolating the optical flow at multiple pixel locations.

5. The method of claim 1, further comprising:
    estimating the occlusion masks for the second image frames before generating the target image frame of the scene.

6. The method of claim 1, wherein the convolutional neural network comprises multiple convolution layers and multiple transposed convolutional layers.

7. An apparatus comprising:
    at least one image sensor; and
    at least one processing device configured to:
        obtain a first image frame and multiple second image frames of a scene using the at least one image sensor, each of the second image frames having an exposure time different from an exposure time of the first image frame;
        generate blur kernels indicating a motion direction of the first image frame using an optical flow network, wherein the optical flow network is configured to determine an optical flow between the multiple second image frames in order to generate the blur kernels for the first image frame;
        refine the blur kernels using a convolutional neural network; and
        generate a target image frame of the scene using the refined blur kernels and occlusion masks for the second image frames.

8. The apparatus of claim 7, wherein, to generate the target image frame of the scene, the at least one processing device is configured to:
    perform an occlusion-aware deconvolution operation using the refined blur kernels and the occlusion masks; and
    render a static background of the target image frame.

9. The apparatus of claim 7, wherein the exposure time of each second image frame is shorter than the exposure time of the first image frame.

10. The apparatus of claim 7, wherein, to generate the blur kernels, the at least one processing device is configured to interpolate the optical flow at multiple pixel locations.

11. The apparatus of claim 7, wherein the at least one processing device is configured to estimate the occlusion masks for the second image frames prior to generation of the target image frame of the scene.

12. The apparatus of claim 7, wherein the convolutional neural network comprises multiple convolution layers and multiple transposed convolutional layers.

13. A non-transitory machine-readable medium containing instructions that when executed cause at least one processor of an electronic device to:
    obtain a first image frame and multiple second image frames of a scene using at least one image sensor, each of the second image frames having an exposure time different from an exposure time of the first image frame;
    generate blur kernels indicating a motion direction of the first image frame using an optical flow network, wherein the optical flow network is configured to determine an optical flow between the multiple second image frames in order to generate the blur kernels for the first image frame;
    refine the blur kernels using a convolutional neural network; and
    generate a target image frame of the scene using the refined blur kernels and occlusion masks for the second image frames.

14. The non-transitory machine-readable medium of claim 13, wherein the instructions that when executed cause the at least one processor to generate the target image frame of the scene comprise:
    instructions that when executed cause the at least one processor to:
        perform an occlusion-aware deconvolution operation using the refined blur kernels and the occlusion masks; and
        render a static background of the target image frame.

15. The non-transitory machine-readable medium of claim 13, wherein the exposure time of each second image frame is shorter than the exposure time of the first image frame.

16. The non-transitory machine-readable medium of claim 13, wherein the instructions that when executed cause the at least one processor to generate the blur kernels comprise:
    instructions that when executed cause the at least one processor to interpolate the optical flow at multiple pixel locations.

17. The non-transitory machine-readable medium of claim 13, wherein the instructions when executed cause the at least one processor to estimate the occlusion masks for the second image frames prior to generation of the target image frame of the scene.

18. The non-transitory machine-readable medium of claim 13, wherein the convolutional neural network comprises multiple convolution layers and multiple transposed convolutional layers.

19. The method of claim 6, wherein the convolutional neural network is trained using reblur loss by enforcing a ground-truth sharp image, when convolved with an estimated kernel, to be the same as a blur input.

20. The apparatus of claim 12, wherein the convolutional neural network is trained using reblur loss by enforcing a ground-truth sharp image, when convolved with an estimated kernel, to be the same as a blur input.

\* \* \* \* \*